United States Patent [19]

Stewart et al.

[11] Patent Number: 5,104,447
[45] Date of Patent: Apr. 14, 1992

[54] OXYALUMINUM ACYLATE CONTAINING EMULSION COMPOSITIONS AND USE

[75] Inventors: Van A. Stewart, Lincoln, Nebr.; Donald R. Varina, Baltimore, Md.; Michael E. Wilson, Middleburg, Fla.

[73] Assignee: PCR Group Inc., Gainesville, Fla.

[21] Appl. No.: 498,564

[22] Filed: Mar. 23, 1990

[51] Int. Cl.$^5$ ............ C10M 105/08; C10M 103/00; C10M 113/16; C09D 5/20
[52] U.S. Cl. .................... 106/2; 106/287.17; 252/35; 252/37.5; 252/37.7; 252/49.5
[58] Field of Search ............ 106/2, 287.17; 252/35, 252/49.5, 37.5, 37.7

[56] References Cited

U.S. PATENT DOCUMENTS

| | | | |
|---|---|---|---|
| 2,839,421 | 6/1958 | Albisetti | 106/287.17 |
| 3,097,957 | 7/1963 | Slotterbeck et al. | 106/287.17 |
| 3,509,083 | 4/1970 | Winerenner et al. | 106/2 |
| 4,193,881 | 3/1980 | Baur | 252/35 |
| 4,324,670 | 4/1982 | Pratt | 252/35 |

*Primary Examiner*—William Dixon, Jr.
*Assistant Examiner*—Carol Bonner
*Attorney, Agent, or Firm*—Hedman, Gibson & Costigan

[57] ABSTRACT

Aqueous compositions of emulsified oxyaluminum acylate solutions comprising solutions of oxyaluminum acylate in a largely water insoluble solvent, an alcohol or an organic acid, an emulsifier or mixture of emulsifiers, and water are provided. Articles comprising substrates rendered water-repellent with such emulsions are provided as well. A process for the preparation of such articles is also provided.

27 Claims, No Drawings

OXYALUMINUM ACYLATE CONTAINING EMULSION COMPOSITIONS AND USE

FIELD OF THE INVENTION

This invention relates to emulsions of oxyaluminum acylate (OAA) solutions and to masonry, limestone, marble and wood substrate articles rendered water repellent by the application thereon, therein, or thereon and therein of such emulsions. More particularly, the present invention relates to emulsified compositions of oxyaluminum acylate solutions which are stable for over one month, which when applied to a substrate leave little or no stain or unsightly residue, and which impart a good water bead.

BACKGROUND OF THE INVENTION

Oxyaluminum acylate solutions and particularly oxyaluminum stearate solutions have been used as water repellent treatments for concrete, masonry, brick, wood, stone and the like. A solution useful in the treatment of concrete generally comprises from 5 to 20 percent oxyaluminum stearate solution in a hydrocarbon solvent. Typically, a solution used as a dip bath for timbers comprises up to a 60 percent solution of oxyaluminum stearate in a hydrocarbon solvent with added resins and fungicides. Unfortunately, all of these formulations are sensitive to water contamination either directly or through atmospheric humidity. Water contamination results in gelation of the treatment solution or white staining on applied surfaces.

Oxyaluminum acylate complexes are also used as gellants for printing inks. See, "Aluminum Gellants for Printing Inks", Bulletin No. TDA-2, Chattem Chemicals, Chattanooga, Tenn. The reaction of oxyaluminum acylate with water (I), alcohol (II), or acid (III), as shown below, yields an aluminum hydroxide which gels the ink formulations.

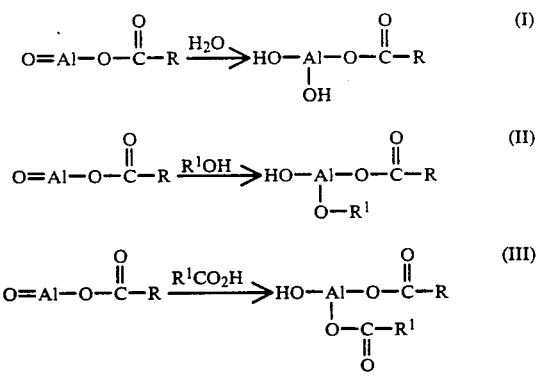

Pratt, U.S. Pat. Nos. 4,280,917, 4,312,769, and 4,324,670, and Pratt et al., U.S. Pat. No. 4,303,538, disclose mixed aromatic/aliphatic oxyaluminum acylates and a process for producing a mixed oxyaluminum acylate composition which is adapted for use as an intermediate in the manufacture of aluminum complex greases. A second acid is added to the oxyaluminum acylate to form a diacylaluminum hydroxy compound which gels the hydrocarbon solvent.

Woodhour et al., U.S. Pat. No. 4,069,313, disclose adjuvent compositions which contain pure isomannide and pure aluminum monostearate as emulsion stabilizers for water-oil emulsion for use as vehicles for the administration of injectable immunological substances.

Cosmetic emulsions incorporating an emulsifier combination of (i) aluminum and/or calcium stearate and (ii) a phosphated mono- and/or di-glyceride are disclosed by Barker et al., U.S. Pat. No. 4,104,403.

Svedas et al., U.S. Pat. No. 4,113,677, disclose an automobile polish which is applied as a dilute solution in hot water and which contains amino functional silicones, dimethyl silicone fluids, a silicone resin film former, an emulsifiable microcrystalline wax, mineral oil, an aliphatic hydrocarbon, dicoco dimethyl ammonium chloride, ethomeen acetate, a metal stearate such as aluminum stearate, an ethoxylated phenol wetting agent, a cyclized rubber and soft water.

Kieft, U.S. Pat. No. 4,201,802, discloses a process for manufacturing prefinished hardboard which includes the use of a pre-press sealer incorporating a metal stearate, such as aluminum stearate, for its release properties and water resistance properties as well as to provide a lattice structure within film-forming material, in addition to a polyvinyl alcohol polymer, emulsified fatty acid and/or fatty esters, and an amine or similar emulsifier.

Dias, U.S. Pat. No. 4,216,261, discloses a process for imparting an intumescent, water repellent, fire retardant finish to fabrics comprising applying to the fabric, an aqueous dispersion of a substantially water insoluble polyphosphate catalyst, a carbonific, a particular blowing agent, an emulsion containing a chlorinated paraffin, and a viscous, water insoluble liquid solution containing a water repellent which may include lead stearate or aluminum acetate.

A novel emulsion composition of an oxyaluminum acylate solution has now been discovered which is extremely useful as a water repellent treatment for various substrates including masonry, wood, limestone, marble and the like. It is an aqueous emulsion, is stable in that it is not sensitive to water for relatively long periods of time, i.e. greater than one month, and has good performance, i.e. significant water bead and a lack of significant staining or unsightly residue.

SUMMARY OF THE INVENTION

According to the present invention, there are provided aqueous compositions comprising emulsions of oxyaluminum acylate solution (a) a water repellency enhancing amount of an oxyaluminum acylate solution which comprises (i) from 5 to 80 parts by weight of oxyaluminum acylate; and (ii) from 95 to 20 parts by weight of at least one largely water insoluble solvent based upon 100 parts by weight of (i) and (ii) combined; (b) a stabilizing amount of at least one alcohol, organic acid, or a combination of the foregoing; (c) an effective amount of an emulsifier or mixture of emulsifiers; and (d) water.

Also contemplated by the invention are water repellent articles which comprise a substrate comprising masonry, limestone, marble, wood or a combination of any of the foregoing, containing therein, thereon or therein and thereon, the emulsion composition described above.

A preferred feature of the present invention is a process for increasing the resistance to penetration by aqueous media of a masonry, limestone, marble, wood or a combination of any of the foregoing substrates, by applying on, in or on and in, the emulsion composition as described above.

DETAILED DESCRIPTION OF THE INVENTION

The oxyaluminum acylate solution of the present invention comprises from 5 to 80 parts by weight of oxyaluminum acylate and from 95 to 20 parts by weight of at least one largely water insoluble solvent.

Oxyaluminum acylates are believed to exist in either monomeric form or in a cyclic trimeric form as shown below:

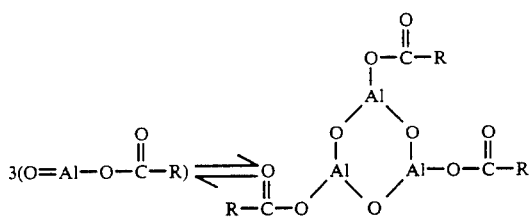

The conditions under which one form is preferred over the other have not yet been determined.

Typically, oxyaluminum acylates are prepared from aluminum triisopropoxide, fatty acids and water according to the equation

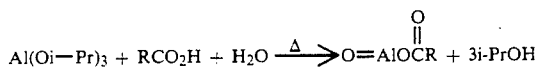

Byproducts commonly present in the product are the acyldiisoproproxyaluminum as shown in reaction (IV) below and the diacylisopropoxyaluminum as shown in reaction (V) below. The residual isopropoxy groups may be displaced by alcohols and acids to give products that are similar in water sensitivity to the oxyaluminum acylate derived products.

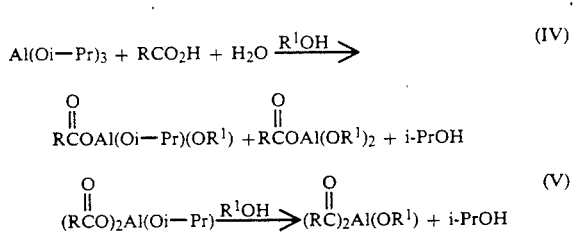

Although a wide variety of oxyaluminum acylate complexes are useful in the present invention, oxyaluminum fatty acid acylates are preferred, and oxyaluminum stearate is most preferred.

The solvent used in the oxyaluminum acylate solution should be largely water insoluble and should be capable of dissolving at least 5 parts by weight of oxyaluminum acylate based upon 100 parts by weight of oxyaluminum acylate and solvent combined.

Largely water insoluble solvents are those solvents that have a solubility in water of less than about five percent. Preferred solvents are hydrocarbon solvents, and most preferred solvents are aliphatic and aromatic hydrocarbon solvents such as mineral spirits, solvent naphtha, xylene, mineral oil and the like. If solvents are to be added to hot oxyaluminum acylates during processing as in processes similar to that of Pratt, U.S. Pat. No. 4,324,670, boiling points of the solvents should be sufficiently high.

One or more cosolvent or diluent may added to the solvent or to the solution. Such cosolvents should be largely water insoluble, compatible with the oxyaluminum acylate solution and unreactive to the oxyaluminum acylate. Suitable cosolvents include ethers, ketones, esters, halogenated hydrocarbons, silicone oils, silicone resins, silanes, siloxanes, waxes, halogenated waxes, natural oils, a combination of any of the foregoing or the like.

Preferably, the oxyaluminum acylate is prepared from aluminum isopropoxide by a process similar to the Pratt '670 process, wherein the aluminum isopropoxide is heated with organic acids to evolve isopropanol. The solution is preferably prepared by diluting the hot oxyaluminum acylate with the largely water insoluble solvent to obtain a fluid solution product. The concentration of the oxyaluminum acylate in the solvents may be determined by the organic acid, the degree of acylate formation, the solubility of the oxyaluminum acylate in the solvent, and/or the viscosity of the solvent.

Although the concentration of the oxyaluminum acylate in the solution useful in the present invention will be from about 5 to about 80 parts by weight based upon 100 parts by weight of oxyaluminum acylate and solvent or solvent and co-solvent combined, a concentration of from 40 to 70 parts by weight is preferred. A most preferred embodiment of the present invention contemplates a 40 to 70 parts by weight solution of oxyaluminum stearate in at least one hydrocarbon solvent.

A water repellency enhancing amount of oxyaluminum acylate solution is at least that amount which when incorporated into the emulsion of the present invention and applied to a suitable substrate will decrease the susceptibility of the substrate to penetration by aqueous media. In a preferred embodiment, the oxyaluminum acylate solution comprises from 1 to 60 parts by weight, based upon 100 parts by weight, of the emulsion composition.

The alcohol, organic acid or combination thereof serves to react with the oxyaluminum acylate to prevent or to delay subsequent reaction with water. A stabilizing amount is at least that amount of the particular stabilizer which will prevent or delay the reaction of the oxyaluminum acylate with water. In a preferred embodiment, the alcohol, organic acid or combination thereof comprises from 2 to 100 parts by weight based upon the weight of the oxyaluminum acylate solution in the emulsion composition. Particular amounts will vary according to the particular stabilizer used and can be determined by one of ordinary skill in the art.

The alcohol stabilizers are generally water insoluble, although partially water soluble alcohols such as isopropanol, n-butanol, or tetrahydrofurfuryl alcohol preferably in small amounts, may be included. Preferably, the alcohol is a primary alcohol, but secondary and tertiary alcohols are suitable as well. Preferred alcohols include n-butanol, t-amyl alcohol, n-hexanol, cyclohexanol, n-hexadecanol, n-octadecanol, i-octadecanol, oleyl alcohol, 2-ethyl-1-hexanol, linalool, menthol, 1,2-dodecanediol, phenol, benzyl alcohol, pentachlorophenol, 1-naphthol, di-t-butyl-p-hydroxytoluene, nonylphenol, or a mixture of any of the foregoing. Most preferred are the $C_6$–$C_{12}$ primary alcohols, particularly those which are liquid at 25° C. and which are highly reactive toward oxyaluminum acylates.

The organic acid stabilizers are preferably largely water insoluble aliphatic, halogenated aliphatic or aromatic acids such as lauric acid, pelargonic acid, myristic acid, stearic acid, isostearic acid, oleic acid, linoleic acid, benzoic acid, perfluorooctanoic acid, dimer acid, hydrogenated tallow fatty acid, mixtures or any of the foregoing and the like. Most preferred are fatty acids which are liquid at 25° C.

A wide range of emulsifiers or surfactants may be used including non-ionic, cationic, anionic, and amphoteric emulsfiers well known in the art. Mixtures of more than one emulsifier are useful in the present invention as well. The preferred emulsifiers are, however, non-ionic.

In general, those emulsifiers or emulsifier blends which have an HLB in the range from about 1.5 to about 20, and preferably in the range from about 4 to about 17, may be used herein. The proper HLB value for a given oxyaluminum acylate solution emulsion must be determined experimentally in order to ascertain the optimum stability.

The HLB classification of surfactants is based on molecular structure and, therefore, can be used to predict the behavior of single molecules. HLB is determined experimentally by techniques known to those skilled in this art, for example, those set forth in the pamphlet "The HLB System" published by ICI Americas, Inc., Wilmington, Del., U.S.A. See also the publication "Adjuvants for Herbicides", Weed Society of America, Champaign, Ill., U.S.A. If the HLB of an emulsifier is below 1.5, it may not produce a stable oil-in-water emulsion. If on the other hand, the HLB is above 20, it may exhibit poor long term stability. HLB values in the range of 4 to 17 are preferred because they provide the most stable emulsions of the above-mentioned oxyaluminum acylate solutions.

Specific examples of emulsifying agents which may be used in accordance herewith include, but are not limited to, the following with the HLB value given in parenthesis following the name: sorbitan trioleate (1.8); sorbitan tristearate (2.1); polyoxyethylene sorbitol hexastearate (2.6); glycerol monostearate (3.8); sorbitan monooleate (4.3); sorbitan monostearate (4.7); polyoxyethylene(2 mole) stearyl ether (4.9); sorbitan monopalmitate (6.7); polyoxypropylene mannitol dioleate (8); polyoxyethylene sorbitol oleate (9.2); polyoxyethylene stearate (9.6); polyoxyethylene sorbitan monooleate (10.0); polyoxyethylene monooleate (11.4); polyoxyethylene(6 mole) tridecyl ether (11.4); polyoxyethylene(10 mole) cetyl ether (12.9); polyoxyethylene sorbitan monooleate (15); polyoxyethylene(20 mole) stearyl ether (15.3); polyoxyethylene (15 mole) tridecyl ether (15.4); polyoxyethylene alkylamine (cationic, 15.5); polyoxyethylene alcohols having an HLB of 9.7, about 10, and 11.6; ethoxylated nonylphenols having HLB values of 10, 11 and 12; dialkylphenol ethoxylates having an HLB value of 10.6; block copolymers of ethylene oxide and propylene having HLB values in the range of 5.5 to 15; ethoxylated octyl phenols having an HLB of about 13.5, 17.3, and 17.9; fatty acid glycerides having an HLB value of approximately 4, sodium lauryl sulfate, mixtures of any of the foregoing, and the like.

The preferred emulsifying agents, given in the table below, provide especially useful emulsions of oxyaluminum acylate solutions.

TABLE 1

| TYPE OF SURFACTANT | EXAMPLES (SUPPLIER: HLB) |
| --- | --- |
| Polyoxyethylene alcohols | Brij 30 (ICI Americas; 9.7) |
| | Tergitol 15-S-3 (Union Carbide; approx. 10) |
| | Triton DF 16 (Rohm & Haas; 11.6) |
| Ethoxylated nonyl phenols | NP-6 (Union Carbide; 11) |

TABLE 1-continued

| TYPE OF SURFACTANT | EXAMPLES (SUPPLIER: HLB) |
| --- | --- |
| | NP-7 (Union Carbide; 12) |
| | CO-520 (GAF; 10) |
| Dialkyl phenol ethoxylate | DM-530 (GAF; 10.6) |
| Block copolymers of ethylene oxide and propylene oxide | Pluronics (BASF) L42 (8), L62 (7), L64 (15) L72 (6.5), L92 (5.5), 25R2 (6.3) Tetronic 702 (BASF; 7) |
| Fatty acid glycerides | Arlacel 165 (ICI Americas; 4) |
| Sorbitan fatty acid esters | Spans (ICI Americas) 20 (8.6), 40 (6.7), 60 (4.7) 80 (4.3) |
| Polyoxylethylene sorbitan fatty acid esters | Tween 61 (ICI Americas; 9.6) Tween 81 (ICI Americas; 10.0) Atlas G-1096 |
| Blends of sorbitan esters with polyoxyethylene amines | Atlas G-2090 (ICI Americas) |
| Amphoteric | Atlas G-271 (ICI Americas) |
| Polyvinyl alcohol | (Air Products and Chemicals, Inc.) |
| Blend of ethoxylated octylphenols | Triton X-100 and Triton X-305 (Rohm & Haas, about 15) |

Blending may be necessary, and desirable, if one of the emulsifiers, e.g., sodium lauryl sulfate, has an HLB outside the range of 1.5 to 20. Sodium lauryl sulfate, HLB about 40, will be blended with a low HLB material, as illustrated above, for use. A preferred embodiment of the present invention incorporates a blend of more than one ethoxylated alkyl phenol, and a most preferred embodiment uses a blend of more than one ethoxylated octyl phenol.

An effective amount of emulsifier is at least that amount which is necessary to form an emulsion.

Crude emulsions are formed from the initial mixing of the components of the composition of the present invention. Preferably, they are subsequently homogenized with conventional equipment under conventional conditions, e.g. a Gaulin 15 MR homogenizer at 6000 psi.

The emulsion compositions of the present invention may also optionally include fungicides, biocides, buffers, thickening agents, fumed silica, silanes, siloxanes, natural and synthetic oils, silicone oils, silicone resins, pigments, colorants, fragrances, UV stabilizers or any combination of the foregoing. Any of these additives can be used in conventional amounts.

Biocides are any of those agents well known in the art for imparting antimicrobial and biocidal activity. The amount of any biocide generally will range from about 0.1 to about 5 parts by weight based on the 100 parts by weight of the composition. Suitable biocidal agents for these embodiments comprise 6-acetoxy-2,4-dimethyl-m-dioxane, sold by Givaudan Corp. under the trademark Giv-Gard ® DXN biocide, methyl p-methoxy benzoate, and the like. Typical concentrations of these biocides are 0.15 parts by weight.

Water repellency is resistance to penetration by aqueous media.

The oxyaluminum acylate solution emulsion compositions of the present invention have the ability to penetrate a suitable substrate well, are relatively stable for long periods of time, i.e. over one month, leave little or no stain or unsightly residue and impart a good water bead.

Substrates suitable for treatment on, in or on and in include masonry, limestone, marble, wood or a combination of any of the foregoing.

The term "masonry" used herein is meant to describe any porous inorganic substrate, particularly building compositions and including but not limited to structural ceramics such as common brick, paving brick, face brick, sewer pipe, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick) and porcelain spark plugs, etc.

"Masonry" also includes stone, tile, artificial stone, abode, concrete and reinforced concrete such as found in roadways, bridge decks, airport runways, parking garage decks, and other concrete building structures.

The emulsion is applied on, in, or on and in the substrate by any conventional means known to one of ordinary skill in the art including but not limited to spraying, sponging or painting.

DESCRIPTION OF THE PREFERRED EMBODIMENT

The following examples illustrate the invention without limitation. All parts are given by weight unless otherwise indicated. A good penetration rating of the emulsion composition on concrete is achieved if the homogenized emulsion is absorbed within several seconds. A good performance rating of the emulsion composition is achieved if treated concrete displays significant water bead within four hours of application of the emulsion composition and displays little or no staining or unsightly residue.

EXAMPLE 1

14.3 parts of an oxyaluminum stearate solution (OAS-70) of 70 parts of oxyaluminum stearate (OAS) and 30 parts of light aromatic solvent naphtha (D-100, Chattem Chemicals—Chattanooga, Tenn.) is mixed with 5.7 parts of decyl alcohol stabilizer (Epal® 10—Ethyl Corp.—Baton Rouge, La.). The resultant solution is mixed with 0.56 parts of ethoxylated octylphenol emulsifier (Triton® X-100—Rohm & Haas Company—Philadelphia, Pa.), and this solution is then slowly poured into a magnetically stirred solution of 0.24 parts of ethoxylated octylphenol emulsifier (Triton® X-305—Rohm & Haas Company) and 79.0 parts water containing 0.08 parts of $NaHCO_3$ buffer and 0.12 parts of 6-acetoxy-2,4-dimethyl-m-dioxane biocide (Giv-Gard® DXN, Givaudan Corp., Clifton, N.J.).

After one hour of vigorous stirring, an 11 ml sample is removed and is spun in a centrifuge at high speed for 30 minutes to separate the crude emulsion. The rest of the crude emulsion is allowed to stand for 30 minutes and is then homogenized in a Gaulin 15 MR homogenizer at 6000 psi.

The homogenized emulsion is applied to a concrete block.

Properties are summarized in Table 2.

COMPARATIVE EXAMPLE 1A*

The procedure of Example 1 is followed substituting 20 parts of the OAS-70 solution and omitting the decyl alcohol stabilizer.

The crude emulsion gels and cannot be homogenized. Properties are summarized in Table 2.

COMPARATIVE EXAMPLE 1B*

The procedure of Example 1 is followed substituting 17.1 parts of the OAS-70 solution and 2.9 parts of the decyl alcohol stabilizer.

The crude emulsion gels and cannot be homogenized. Properties are summarized in Table 2.

EXAMPLE 2

The procedure of Example 1 is followed substituting 11.4 parts of the OAS-70 solution and 8.6 parts of the decyl alcohol stabilizer.

Properties are summarized in Table 2.

Examples 1 and 2 demonstrate emulsions of the present invention prepared using alcohol stabilizers. When compared with Comparative Examples 1A* and 1B*, Examples 1 and 2 demonstrate the requirement of a stabilizing amount of this specific alcohol as 2.9 parts of decyl alcohol is not enough to produce an emulsion of the particular OAS solution (OAS-70), but 5.7 parts of decyl alcohol is sufficient.

TABLE 2

| EMULSION COMPOSITION OF OAS-70 WITH DECYL ALCOHOL STABILIZER | | | | |
|---|---|---|---|---|
| | 1 | 1A* | 1B* | 2 |
| OAA Solution$^A$ | 14.3 | 20.0 | 17.1 | 11.4 |
| Decyl Alcohol$^B$ | 5.7 | — | 2.9 | 8.6 |
| Emulsifier$^C$ | 0.8 | 0.8 | 0.8 | 0.8 |
| Water | 79.0 | 79.0 | 79.0 | 79.0 |
| Buffer$^D$ | 0.08 | 0.08 | 0.08 | 0.08 |
| Biocide$^E$ | 0.12 | 0.12 | 0.12 | 0.12 |
| Centrifuge Result$^F$ | 2.7 ml oily top layer | 3.5 ml top layer of large gel particles | 2.4 ml top layer of solid gel | 2.7 ml oily top layer |
| Crude Emulsion$^G$ | fluid, dispersable top layer | gelatinous top layer | top layer of firm gel | fluid, dispersable top layer |
| Homogenized Emulsion$^H$ | uniform milky | could not be homogenized | could not be homogenized | uniform milky |

TABLE 2-continued

EMULSION COMPOSITION OF OAS-70 WITH DECYL ALCOHOL STABILIZER

| 1 | 1A* | 1B* | 2 |
|---|-----|-----|---|
| emulsion | | | emulsion |

[A] 70 parts of oxyaluminum stearate, 30 parts of light aromatic solvent naphtha (D-100 - Chattem Chemicals - Chattanooga, TN).
[B] Epal ® 10 (Ethyl Corp. - Baton Rouge, LA).
[C] 0.056 parts of ethoxylated octylphenol (Triton ® X-100 - Rohm & Haas Co. - Philadelphia, PA) is added to the OAA solution. 0.24 parts of ethoxylated octylphenol (Triton ® X-305 - Rohm & Haas Co.) is added to the water.
[D] NaHCO$_3$.
[E] 6-acetoxy-2,4-dimethyl-m-dioxane (Giv-Gard ® DXN - Givaudan Corp. - Clifton, New Jersey).
[F] 11 ml of crude emulsion is spun at high speed for 30 minutes.
[G] The emulsion is rapidly stirred with a magnetic stirrer for 1 hour and then is allowed to stand for 30 minutes.
[H] The redispersed crude emulsion is passed through a Gaulin 15 MR homogenizer at 6000 psi.

COMPARATIVE EXAMPLE 3*

14 parts of an oxyaluminum stearate solution (OAS-70) of 70 parts of OAS and 30 parts of light aromatic solvent naphtha (D-100—Chattem Chemicals—Chattanooga, Tenn.) is mixed with 6 parts of D-100 to give 50% OAS. The resultant solution is mixed with 0.56 parts of ethoxylated octylphenol emulsifier (Triton ® X-100—Rohm & Haas Company—Philadelphia, Pa.), and this solution is then slowly poured into a magnetically stirred solution of 0.24 parts of ethoxylated octylphenol emulsifier (Triton ® X-305—Rohm & Haas Company) and 79.0 parts of water containing 0.08 parts of NaHCO$_3$ buffer and 0.12 parts of 6-acetoxy-2,4-dimethyl-m-dioxane biocide (Giv-Gard ® DXN—Givaudan Corp.—Clifton, N.J.).

After 1 hour of vigorous stirring an 11 ml sample is removed and is spun in a centrifuge at high speed for 30 minutes to separate the crude emulsion.

The crude emulsion is not smooth enough to homogenize. Properties are summarized in Table 3.

COMPARATIVE EXAMPLE 4*

The procedure of Comparative Example 3* is followed substituting 12 parts of OAS-70 solution and 8 parts of D-100 to give 42% OAS.

The crude emulsion is not smooth enough to homogenize. Properties are summarized in Table 3.

COMPARATIVE EXAMPLE 5*

The procedure of Comparative Example 3* is followed substituting 10 parts of the OAS-70 solution and 10 parts of D-100 give 35% OAS.

The crude emulsion is not smooth enough to homogenize. Properties are summarized in Table 3.

COMPARATIVE EXAMPLE 6*

The procedure of Comparative Example 3* is followed substituting 8 parts of the OAS-70 solution and 12 parts of D-100 to give 32% OAS.

The crude emulsion is not smooth enough to homogenize. Properties are summarized in Table 3.

Comparative Examples 3*, 4*, 5* and 6* demonstrate that attempts to prepare emulsion compositions with stabilizers other than alcohols or organic acids, i.e., hydrocarbon solvents such as solvent naphtha, at various concentrations are unsuccessful.

TABLE 3

ATTEMPTED EMULSIONS OF OAS/D-100 AND MINERAL SPIRITS

| | 3* | 4* | 5* | 6* |
|---|---|---|---|---|
| OAS Solution[A] | 14.0 | 12.0 | 10.0 | 8.0 |
| Solvent Naphtha[B] | 6.0 | 8.0 | 10.0 | 12.0 |
| Emulsifier[C] | 0.8 | 0.8 | 0.8 | 0.8 |
| Water | 79.0 | 79.0 | 79.0 | 79.0 |
| Buffer[D] | 0.08 | 0.08 | 0.08 | 0.08 |
| Biocide[E] | 0.12 | 0.12 | 0.12 | 0.12 |
| Centrifuge Result[F] | 3.5 ml oily top layer | 3.4 ml layer of large gel particles | 3.2 ml top layer of solid gel | 2.7 ml oily top layer |
| Crude Emulsion[G] | gelatinous top layer | slushy gelatinous top layer | firm grainy top layer | firm grainy top layer |
| Homogenized Emulsion[H] | could not be homogenized | could not be homogenized | could not be homogenized | could not be homogenized |

[A] 70 parts of oxyaluminum stearate, 30 parts of light aromatic solvent naphtha (D-100 - Chattem Chemicals - Chattanooga, TN).
[B] D-100 (Chattem Chemicals - Chattanooga, TN).
[C] 0.56 parts of ethoxylated octylphenol (Triton ® X-100 - Rohm & Haas Co. - Philadelphia, PA) is added to the OAS solution. 0.24 parts of ethoxylated octylphenol (Triton ® X-305 - Rohm & Haas Co.) is added to the water.
[D] NaHCO$_3$.
[E] 6-acetoxy-2,4-dimethyl-m-dioxane (Giv-Gard ® DXN - Givaudan Corp. - Clifton, New Jersey).
[F] 11 ml of crude emulsion is spun at high speed for 30 minutes.
[G] The emulsion is rapidly stirred with a magnetic stirrer for 1 hour, and then is allowed to stand for 30 minutes.
[H] The redispersed crude emulsion is passed through a Gaulin 15 MR homogenizer at 6000 psi.

EXAMPLE 7

17.1 parts of a oxyaluminum stearate solution (OAS-60) of 60 parts of oxyaluminum stearate (OAS) and 40 parts of light aromatic solvent naphtha (D-100—Chattem Chemicals—Chattanooga, Tenn.) is mixed with 2.9 parts of 1-hexyl alcohol stabilizer (Aldrich Chemical Co.—Milwaukee, Wis.). The resultant solution is mixed with 0.56 parts of ethoxylated octylphenol emulsifier (Triton® X-100—Rohm & Haas—Philadelphia, Pa.), and this solution is then slowly poured into a magnetically stirred solution of 0.24 parts of ethoxylated octylphenol emulsifier (Triton® X-305—Rohm & Haas Company) and 79.0 parts of water containing 0.08 parts of $NaHCO_3$ buffer and 0.12 parts of 6-acetoxy-2,4-dimethyl-m-dioxane biocide (Giv-Gard® DXN—Givaudan Corp.—Clifton, N.J.).

After one hour of vigorous stirring, an 11 ml sample is removed and is spun in a centrifuge at high speed for 30 minutes to separate the crude emulsion. The rest of the crude emulsion is allowed to stand for 30 minutes and is then homogenized in a Gaulin 15 MR homogenizer at 6000 psi.

The homogenized emulsion is applied to a concrete block.

Properties are summarized in Table 4.

COMPARATIVE 7A*

The procedure of Example 7 is followed substituting 2-propanol (Aldrich Chemical Co.—Milwaukee, Wis.) for the alcohol stabilizer.

Properties are summarized in Table 4.

COMPARATIVE EXAMPLE 7B*

The procedure of Example 7 is followed substituting 1-butanol (Aldrich Chemical Co.—Milwaukee, Wis.) for the alcohol stabilizer.

Properties are summarized in Table 4.

COMPARATIVE EXAMPLE 7C*

The procedure of Example 7 is followed substituting t-butanol (Aldrich Chemical Co.—Milwaukee, Wis.) for the alcohol stabilizer.

Properties are summarized in Table 4.

COMPARATIVE EXAMPLE 7D*

The procedure of Example 7 is followed substituting cyclohexanol (Aldrich Chemical Co.—Milwaukee, Wis.) for the alcohol stabilizer.

Properties are summarized in Table 4.

COMPARATIVE EXAMPLE 7E*

The procedure of Example 7 is followed substituting oleyl alcohol, tech. 65 percent, (Aldrich Chemical Co.—Milwaukee, Wis.) for the alcohol stabilizer.

Properties are summarized in Table 4.

COMPARATIVE EXAMPLE 7F*

The procedure of Example 7 is followed substituting 2,2,2-trifluoroethanol (PCR, Inc.—Gainesville, Fla.) for the alcohol stabilizer.

Properties are summarized in Table 4.

COMPARATIVE EXAMPLE 7G*

The procedure of Example 7 is followed substituting triethylene glycol monomethylether (Aldrich Chemical Co.—Milwaukee, Wis.) for the alcohol stabilizer.

Properties are summarized in Table 4.

EXAMPLE 8

The procedure of Example 7 is followed substituting 1-octyl alcohol (Epal®8—Ethyl Corp., Baton Rouge, La.) for the alcohol stabilizer.

Properties are summarized in Table 4.

EXAMPLE 9

The procedure of Example 7 is followed substituting 2-ethyl-1-hexanol (Aldrich Chemical Co.—Milwaukee, Wis.) for the alcohol stabilizer.

Properties are summarized in Table 4.

EXAMPLE 10

The procedure of Example 7 is followed substituting 1-decyl alcohol (Epal®10—Ethyl Corp.—Baton Rouge, La.) for the alcohol stabilizer.

Properties are summarized in Table 4.

EXAMPLE 11

The procedure of Example 7 is followed substituting linalool (Glidco Organics—Jacksonville, Fla.) for the alcohol stabilizer and then heating the alcohol with the OAS-60 solution to 150° C. and removing about 2 ml of residual isopropanol by distillation before stirring into the aqueous buffer/biocide solution.

Properties are summarized in Table 4.

EXAMPLE 12

The procedure of Example 7 is followed substituting 1-dodecyl alcohol (Epal®12—Ethyl Corp.—Baton Rouge, La.) for the alcohol stabilizer.

Properties are summarized in Table 4.

EXAMPLE 13

The procedure of Example 7 is followed substituting a blend of primary $C_{12}$, $C_{14}$, $C_{16}$ and $C_{18}$ alcohols with a hydroxyl value of 267 mg KOH/g and a melting point (mp.) of 25° C. (Epal®1218—Ethyl Corp.) for the alcohol stabilizer and then melting the alcohol, mixing it with the OAS-60 solution, and heating to a homogenous solution before stirring it into the aqueous buffer/biocide solution.

Properties are summarized in Table 4.

COMPARATIVE EXAMPLE 13A*

The procedure of Example 13 is followed substituting isomethanol, a $C_{10}$ secondary alcohol, mp. 77° C., (Aldrich Chemical Co.—Milwaukee, Wis.) for the alcohol stabilizer.

Properties are summarized in Table 4.

COMPARATIVE EXAMPLE 13B*

The procedure of Example 13 is followed substituting a blend of primary $C_{16}$, $C_{18}$, and a small amount of $C_{20}$ alcohols with a hydroxyl value of 214 mg KOH/g and a mp. of 41° C. (Epal® 1618T—Ethyl Corp.—Baton Rouge, La.) for the alcohol stabilizer.

Properties are summarized in Table 4.

COMPARATIVE EXAMPLE 13C*

The procedure of Example 13 is followed substituting 2-ethyl-1,3-hexanediol, mp. of 72° C., (Aldrich Chemical Co.—Milwaukee, Wis.) for the alcohol stabilizer.

Properties are summarized in Table 4.

EXAMPLE 14

The procedure of Example 7 is followed substituting 1-octadecyl alcohol, mp. of 60° C., (Aldrich Chemical Co.—Milwaukee, Wis.) for the alcohol stabilizer and then melting the alochol, mixing it with the OAS-60 solution, and heating to a homogenous solution before stirring it into the aqueous buffer/biocide solution.

Properties are summarized in Table 4.

EXAMPLE 15

The procedure of Example 7 is followed substituting 1,2-dodecane diol, mp. of 58° C., (Aldrich Chemical Co.—Milwaukee, Wis.) for the alcohol stabilizer and then melting the alcohol, mixing it with the OAS-60 solution, and heating to a homogenous solution before stirring it into the aqueous buffer/biocide solution.

Properties are summarized in Table 4.

EXAMPLE 16

The procedure of Example 7 is followed substituting 14.2 parts of oxyaluminum stearate solution for the OAS-60 solution and 5.8 parts of oleyl alcohol (Aldrich Chemical Co.—Milwaukee, Wis.) for the alcohol stabilizer.

Properties are summarized in Table 4.

Examples 7-16 demonstrate that a broad range of alcohols are suitable for use in the preparation of the emulsions compositions of the present invention.

Comparative Examples 7A*-7G* and 13A*-13C* demonstrate that although a wide selection of alcohols are suitable stabilizers for the present invention, the particular alcohols must be incorporated in individually specific amounts to be effective. That stabilizing amount is determined in part by the concentration of oxyaluminum stearate in the OAS solution. If the amount of the alcohols of the comparative examples were adjusted or if the alcohols were used in combination with other stabilizers of this invention, emulsion compositions of the present invention would result.

TABLE 4

Oxyaluminum Stearate Emulsion Compositions With Alcohol Stabilizers At 2.9 Parts Concentration

| | 7 | 7A* | 7B* | 7C* | 7D* | 7E* | 7F* | 7G* | 8 | 9 |
|---|---|---|---|---|---|---|---|---|---|---|
| OAS Solution[A] | 17.1 | → | → | → | → | → | → | → | → | → |
| Alcohol | 2.9[I] | →[J] | →[K] | →[L] | →[M] | →[N] | →[O] | →[P] | →[Q] | →[R] |
| Emulsifier[B] | 0.8 | → | → | → | → | → | → | → | → | → |
| Water | 79.0 | → | → | → | → | → | → | → | → | → |
| Buffer[C] | 0.08 | → | → | → | → | → | → | → | → | → |
| Biocide[D] | 0.12 | → | → | → | → | → | → | → | → | → |
| Centrifuge | 2.8 ml oily top layer | 3.3 ml top layer of solid gel | 3.4 ml top layer of solid gel | 3.0 ml top layer of solid gel | 3.0 ml top layer of solid gel | 3.0 ml firm top layer | 3.0 ml firm, grainy top layer | 3.0 ml grainy top layer | 2.6 ml oily top layer | 2.7 ml oily top layer |
| Observations[E] | oily top layer | gelatinous top layer but fluid enough to homogenize | gelatinous top layer but fluid enough to homogenize | gelatinous top layer but fluid enough to homogenize | gelatinous top layer, that would not redisperse | firm top layer that would not redisperse | gelatinous top layer but fluid enough to homogenize | grainy top layer but fluid enough to homogenize | oily top layer | oily top layer |
| Crude Emulsion[F] | uniform milky emulsion | freshly homogenized milky with grainy gel | freshly homogenized emulsion was very viscous and contained grainy gel | milky with grainy gel | could not be homogenized | could not be homogenized | freshly homogenized emulsion was very viscous and contained grainy gel | homogeneous thick milky emulsion | uniform milky emulsion | uniform milky emulsion |
| Homogenized Emulsion[G] | | | | | | | | | | |
| Performance on Concrete[H] | good penetration and appearance | poor penetration, left a powdery residue | poor penetration, left a powdery residue | poor penetration, left a powdery residue | not applied to concrete | not applied to concrete | poor penetration, left white residue | poor penetration, left white residue | slow penetration but good appearance | good penetration and appearance |

| | 10 | 11 | 12 | 13 | 13A* | 13B* | 13C* | 14 | 15 | 16 |
|---|---|---|---|---|---|---|---|---|---|---|
| OAS Solution[A] | 17.1 | → | → | → | → | → | → | → | → | 14.2 |
| Alcohol | 2.9[S] | →[T] | →[U] | →[V] | →[W] | →[X] | →[Y] | →[Z] | →[AA] | 5.8[N] |
| Emulsifier[B] | 0.8 | → | → | → | → | → | → | → | → | → |
| Water | 79.0 | → | → | → | → | → | → | → | → | → |
| Buffer[C] | 0.08 | → | → | → | → | → | → | → | → | → |
| Biocide[D] | 0.12 | → | → | → | → | → | → | → | → | → |
| Centrifuge | 2.7 ml viscous oily top layer | 2.8 ml firm top layer | 2.8 ml viscous oily top layer | 3.2 ml viscous oily top layer | 2.8 ml firm waxy top layer that would not redisperse | 2.8 ml firm gel top layer slightly gelatinous top layer | 3.0 ml solid top layer that would not redisperse | 2.6 ml solid top layer solidified top layer | 2.6 ml viscous oily top layer slight heating required to disperse | 4.0 ml oily top layer |
| Observations[E] | oily top layer | oily top layer | oily top layer | oily top layer | | | | | | oily top layer |
| Crude Emulsion[F] | | | | | | | | | | |
| Homogenized Emulsion[G] | uniform milky emulsion | uniform milky emulsion | uniform milky emulsion | milky appearance with a trace of gel particles | could not be homogenized | milky appearance with some gel particles | could not be homogenized | heated to 50° C. to homogenize, product had a uniform milky appearance | uniform milky appearance | uniform milky appearance |
| Performance on Concrete[H] | good penetration and appearance | good penetration and appearance | good penetration and appearance | good penetration and appearance | not applied to concrete | slow penetration and some white haze on drying | not applied to concrete | good penetration and appearance | moderate penetration and good appearance | good penetration and appearance |

[A]60 parts of oxyaluminum stearate, 40 parts of light aromatic solvent naphtha (D-100 - Chattem Chemicals - Chattanooga, TN).
[B]0.56 parts of ethoxylated octylphenol (Triton ® X-100 - Rohm & Haas Co. - Philadelphia, PA) is added to the OAS solution, 0.24 parts of ethoxylated octylphenol (Triton ® X-305 - Rohm & Haas Co.) is added to the water.

TABLE 4-continued

Oxyaluminum Stearate Emulsion Compositions With Alcohol Stabilizers At 2.9 Parts Concentration $^C$NaHCO$_3$.
$^D$6-acetoxy-2,4-dimethyl-m-dioxane (Giv-Gard ® DXN, Givaudan Corp. - Clifton, New Jersey).
$^E$11 ml of crude emulsion is spun at high speed for 30 minutes.
$^F$The emulsion is rapidly stirred with a magnetic stirrer for 1 hour and then is allowed to stand for 30 minutes.
$^G$The redispersed crude emulsion is passed through a Gaulin 15 MR homogenizer at 6000 psi.
$^H$Homogenized emulsion is applied to concrete block.
$^I$1-hexyl alchol - (Aldrich Chemical Co. - Milwaukee, WI).
$^J$2-propanol - (Aldrich Chemical Co. - Milwaukee, WI).
$^K$1-butanol - (Aldrich Chemical Co. - Milwaukee, WI).
$^L$t-butanol - (Aldrich Chemical Co. - Milwaukee, WI).
$^M$cyclohexanol - (Aldrich Chemical Co. - Milwaukee, WI).
$^N$oleyl alcohol (tech. 65 percent) - (Aldrich Chemical Co. - Milwaukee, WI).
$^O$2,2,2-trifluoroethanol - (PCR, Inc. - Gainesville, FL).
$^P$triethylene glycol monomethylether - (Aldrich Chemical Co. - Milwaukee, WI).
$^Q$1-octyl alcohol - (Epal ®8 - Ethyl Corp. - Baton Rouge, LA).
$^R$2-ethyl-1-hexanol - (Aldrich Chemical Co. - Milwaukee, WI).
$^S$1-decyl alcohol - (Epal ®10 - Ethyl Corp. - Baton Rouge, LA).
$^T$linalool C$_{10}$ tertiary alcohol - (Glidco Organics - Jacksonville, FL) - The alcohol is heated with the OAS-60 solution to 150° C., and about 2 ml of residual isopropanol is removed by distillation before it is stirred into the aqueous buffer/biocide solution.
$^U$1-dodecyl alcohol - (Epal ®12 - Ethyl Corp. - Baton Rouge, LA).
$^V$a blend of primary C$_{12}$, C$_{14}$, C$_{16}$ and C$_{18}$ alcohols with a hydroxyl value of 267 mg KOH/g and a mp of 25° C. (Epal ®1281 - Ethyl Corp. - Baton Rouge, LA). The alcohol is melted, mixed with the OAS-60 solution, and is heated to a homogenous solution before it is stirred into the aqueous buffer/biocide solution.
$^W$isomenthol, C$_{10}$ secondary alcohol, mp. 77° C. - (Aldrich Chemical Co. - Milwaukee, WI).
$^X$a blend of primary C$_{16}$, C$_{18}$ and a small amount of C$_{20}$ alcohols with a hydroxyl value of 214 mg KOH/g and a mp. of 41° C. (Epal ®1618T - Ethyl Corp. - Baton Rouge, LA).
$^Y$2-ethyl-1,3-hexanediol, mp. 72° C. (Aldrich Chemical Co. - Milwaukee, WI).
$^Z$1-octyldecyl alcohol, mp. 60° C. (Aldrich Chemical Co. - Milwaukee, WI) - The alcohol is melted, is mixed with the OAS-60 solution and is heated to a homogeneous solution before it is stirred into the aqueous buffer/biocide solution.
$^{AA}$1,2-dodecane diol, mp. 58° C. (Aldrich Chemical Co. - Milwaukee, WI) - The alcohol is melted, mixed with the OAS-60 solution and is heated to a homogeneous solution before it is stirred into the aqueous buffer/biocide solution.

EXAMPLE 17

The procedure of Example 7 is followed substituting isostearic acid (Emersol ® 871—Quantum Chemical Co.—Cincinatti, Ohio), an organic acid stabilizer, for the alcohol stabilizer.

Properties are summarized in Table 5.

COMPARATIVE EXAMPLE 17A*

The procedure of Example 7 is followed substituting acetic acid (Aldrich Chemical Co.—Milwaukee, Wis.), an organic acid stabilizer, for the alcohol stabilizer.

Properties are summarized in Table 5.

COMPARATIVE EXAMPLE 17B*

The procedure of Example 7 is followed substituting benzoic acid, mp. 122° C. (Aldrich Chemical Co.—Milwaukee, Wis.), an organic acid stabilizer, for the alcohol stabilizer.

Properties are summarized in Table 5.

EXAMPLE 18

The procedure of Example 7 is followed substituting oleic acid (Emersol ® 213—Quantum Chemical Co.—Cincinnati, Ohio), an organic acid stabilizer, for the alcohol stabilizer.

Properties are summarized in Table 5.

Examples 17 and 18 demonstrate the incorporation of organic acids as stabilizers in emulsion compositions according to the present invention.

Comparative Examples 17A*–17D* demonstrate that although a wide selection of organic acids are suitable stabilizers for the present invention, the particular organic acids must be incorporated in individually specific amounts to be effective. That stabilizing amount is determined in part by the concentration of oxyaluminum stearate in the OAS solution. If the amounts of the organic acids of the comparative examples were adjusted or if the organic acids were used in combination with other stabilizers of this invention, emulsion compositions of the present invention would result.

TABLE 5

OXYALUMINUM STEARATE EMULSION COMPOSITIONS WITH ORGANIC ACID STABILIZERS AT 2.9 PARTS CONCENTRATION

|  | 17 | 17A* | 17B* | 17C* | 17D* | 18 |
|---|---|---|---|---|---|---|
| OAS Solution$^A$ | 17.1 | → | → | → | → | → |
| Organic Acid | 2.9$^I$ | →$^J$ | →$^K$ | →$^L$ | →$^M$ | →$^N$ |
| Emulsifier$^B$ | 0.8 | → | → | → | → | → |
| Water | 79.0 | → | → | → | → | → |
| Buffer$^C$ | 0.08 | → | → | → | → | → |
| Biocide$^D$ | 0.12 | → | → | → | → | → |
| Centrifuge Observation$^E$ | 2.6 ml tacky gelatinous top layer | 4.3 ml tacky gel on top | set up as a firm gel prior to emulsification | 5 ml grainy gel | 2.8 ml firm gel gel on bottom | 3 ml viscous oily top layer |
| Crude Emulsion$^F$ | oily top layer | tacky grainy foam on top | did not form emulsion | firm grainy gel on top | oily bottom layer | oily top layer |
| Homogenized Emulsion$^G$ | uniform milky emulsion | freshly homogenized emulsion was very viscous contained grainy gel | did not form emulsion | could not be homogenized | uniform milky emulsion but organic layer settles to bottom | uniform milky emulsion |
| Performance on Concrete$^H$ | good penetration and appearance | poor penetration left a white residue | not applied to concrete | not applied to concrete | moderate penetration leaving a white haze when dried | slow penetration and good appearance |

$^A$60 parts of oxyaluminum stearate, 40 parts of light aromatic solvent naphtha (D-100 - Chattem Chemicals - Chattanooga, TN).
$^B$0.56 parts of ethoxylated octylphenol (Triton ® X-100, Rohm & Haas Co. - Philadelphia, PA) is added to the OAA Solution. 0.24 parts of ethoxylated octylphenol (Triton ® X-305 - Rohm & Haas Co.) is added to the water.
$^C$NaHCO$_3$.
$^D$6-acetoxy-2,4-dimethyl-m-dioxane (Giv-Gard ® DXN - Givaudan Corp. - Clifton, New Jersey).
$^E$11 ml of crude emulsion is spun at high speed for 30 minutes.
$^F$The emulsion is rapidly stirred with a magnetic stirrer for 1 hour and then is allowed to stand for 30 minutes.
$^G$The redispersed crude emulsion is passed through a Gaulin 15 MR homogenizer at 6000 psi.
$^H$Homogenized emulsion is applied to concrete block.
$^I$isostearic acid (Emersol ® 871 - Quantum Chemical Co. - Cincinatti, OH).
$^J$acetic acid - (Aldrich Chemical Co. - Milwaukee, WI).
$^K$benzoic acid, mp. 122° C. - (Aldrich Chemical Co. - Milwaukee, WI).
$^L$trifluoroacetic acid - (PCR, Inc. - Gainesville, FL).
$^M$perfluorooctanoic acid - (PCR, Inc. - Gainesville, FL).
$^N$oleic acid - (Emersol ® 213 - Quantum Chemical Co. - Cincinatti, OH).

COMPARATIVE EXAMPLE 17C*

The procedure of Example 7 is followed substituting trifluoroacetic acid (Aldrich Chemical Co.—Milwaukee, Wis.), an organic acid stabilizer, for the alcohol stabilizer.

Properties are summarized in Table 5.

COMPARATIVE EXAMPLE 17D*

The procedure of Example 7 is followed substituting perfluorooctanoic acid (PCR, Inc.—Gainesville, Fla.), an organic acid stabilizer, for the alcohol stabilizer.

Properties are summarized in Table 5.

EXAMPLE 19

14.7 parts of an oxyaluminum stearate solution (OAS-70) of 70 parts of oxyaluminum stearate (OAS) and 30 parts of light aromatic solvent naphtha (D-100, Chattem Chemicals—Chattanooga, Tenn.) is mixed with 2.9 parts of decyl alcohol (Epal ®10—Ethyl Corp.—Baton Rouge, La.) and 2.4 parts of 1,1,1-trichloroethane cosolvent (Aldrich Chemical Co.—Milwaukee, Wis.). The resultant solution is mixed with 0.56 parts of ethoxylated octylphenol emulsifier (Triton ® X-100—Rohm & Haas Company—Philadelphia, Pa.), and this solution is then slowly poured into a magnetically stirred solution of 0.24 parts of ethoxylated octylphenol emulsifier (Triton ® X-305—Rohm & Haas Company) and 79.0 parts of water containing 0.08 parts NaHCO$_3$ buffer and 0.12 parts of 6-acetoxy-2,4-dimethyl-m-dioxane biocide (Giv-Gard ® DXN—Givaudan Corp., Clifton, N.J.).

After 1 hour of vigorous stirring, an 11 ml sample is removed and spun in a centrifuge at high speed for 30 minutes to form a crude emulsion. The crude emulsion is allowed to stand for 30 minutes and is then homogenized in a Gaulin 15 MR homogenizer at 6000 psi to yield a uniform milky emulsion which when applied to a concrete block, penetrates the concrete well and dries to leave a negligible stain and a good water bead.

EXAMPLE 20

The procedure of Example 19 is followed substituting 1,1,2-trichlorotrifluoroethane (Aldrich Chemical Co.—Milwaukee, Wis.) for the cosolvent.

The homogenized emulsion is uniform and milky in appearance, and when applied to a concrete block, penetrates the concrete well, and leaves a negligible stain and a good water bead.

EXAMPLE 21

The procedure of Example 19 is followed substituting methylene chloride (Aldrich Chemical Co.—Milwaukee, Wis.) for the cosolvent.

The homogenized emulsion is uniform and milky in appearance and when applied to a concrete block, penetrates the concrete well and leaves a negligible stain and a good water bead.

EXAMPLE 22

The procedure of Example 19 is followed substituting silicone oil (50 cSt) (Dow-Corning Corp.—Midland, Mich.) for the cosolvent.

The homogenized emulsion is uniform and milky in appearance, and when applied to a concrete block, penetrates the concrete well and leaves a negligible stain and a good water bead.

EXAMPLE 23

The procedure of Example 19 is followed substituting cosolvent.

The homogenized emulsion is uniform and milky in appearance, and when applied to a concrete block, penetrates the concrete well and leaves a negligible stain and a good water bead.

EXAMPLE 24

The procedure of Example 19 is followed substituting a siloxane (HL-250—Goldschmidt Chemical Co.—Hopewell, Va.) for the cosolvent.

The homogenized emulsion is uniform and milky in appearance, and when applied to a concrete block, penetrates the concrete well and leaves a negligible stain and a good water bead.

EXAMPLE 25

The procedure of Example 19 is followed substituting a silane (primarily n-octyltriethoxysilane—Prosil TM 9202 silane—PCR, Inc.—Gainesville, Fla.) for the cosolvent.

The homogenized emulsion is uniform and milky in appearance, and when applied to a concrete block, penetrates the concrete well and leaves a negligible stain and a good water bead.

Examples 19-25 demonstrate that a wide selection of cosolvents or diluents may be combined in the stabilizers incorporated into the emulsion compositions of the present invention.

EXAMPLE 26

150 g (ca. 2.8 moles) of an oxyaluminum stearate solution (OAS-60) of 60 parts of oxyaluminum stearate and 40 parts of light aromatic solvent naphtha (D-100—Chattem Chemicals—Chattanooga, Tenn.) and 300 g (1.9 moles) of decyl alcohol stabilizer (Epal ® 10—Ethyl Corp.—Baton Rouge, La.) are placed in a 3 liter three neck round bottom flask fitted with a thermometer, a nitrogen sparge, a magnetic stirrer and a distillation head. The mixture is gradually heated to 180° C. with a slow nitrogen flow through the solution. After 213 g of distillate are collected, the reaction is cooled to ambient temperature.

The "percent solids" of product is determined by baking 2 g samples at 110° C. for 1 hour and is determined to be 72.9 percent.

20 parts of the product is mixed with 0.56 parts of ethoxylated octylphenol emulsifier (Triton ® X-100—Rohm & Haas Co.—Philadelphia, Pa.), and this solution is then slowly poured into a magnetically stirred solution 0.24 parts of ethoxylated octylphenol emulsifier (Triton ® X-305—Rohm & Haas Company) and 79.0 parts of water containing 0.08 parts of NaHCO$_3$ buffer and 0.12 parts of 6-acetoxy-2,4-dimethyl-m-dioxane biocide (Giv-Gard ® DXN—Givaudan Corp.—Clifton, N.J.).

After 1 hour of vigorous stirring, an 11 ml sample is removed and spun in a centrifuge at high speed for 30 minutes to form a crude emulsion. The crude emulsion is allowed to stand for 30 minutes and is then homogenized in a Gaulin 15 MR homogenizer at 6000 psi to yield a uniform milky emulsion which, when applied to a concrete block, has good penetration and performance.

EXAMPLE 27

The procedure of Example 26 is followed substituting 300 g (1.6 moles) of dodecyl alcohol (Epal ®12—Ethyl Corp.—Baton Rouge, La.) for the alcohol stabilizer. Percent solids is determined to be 74 percent.

The resulting emulsion has good penetration and performance on concrete.

EXAMPLE 28

The procedure of Example 7 is followed substituting an oxyaluminum stearate solution of 60 parts of oxyaluminum stearate and 40 parts of a mixture of C$_9$-C$_{11}$ isopafaffins, f.p. 105° F., (LoSol ® #1—R. N. Eaton & Co., Inc.—Riverside, Mo.) prepared by diluting a 67 percent OAS in LoSol ® #1 solution (Chattem Chemicals—Chattanooga, Tenn.) with additional LoSol ® #1, for the OAS-60 solution.

The homogenized emulsion is milky and penetrates well into a concrete block. The dried concrete beads water well.

COMPARATIVE EXAMPLE 28A*

The procedure of Example 28 is followed omitting the alcohol stabilizer.

The mixture becomes an intractable gel before centrifuging.

EXAMPLE 29

The procedure of Example 7 is followed substituting an oxyaluminum stearate solution of 60 parts of oxyaluminum stearate and 40 parts of petroleum hydrocarbon naphtha, f.p. 143° F., (Barsol®104—Triangle Refineries Inc.—Shreveport, La.) prepared by diluting a 67 percent OAS in petroleum hydrocarbon naphtha solution f.p. 143° F. (Barsol®104) with additional petroleum hydrocarbon naphtha (Barsol®104), for the OAS-60 solution.

The homogenized emulsion is milky and penetrates well into a concrete block. The dried concrete beads water well.

COMPARATIVE EXAMPLE 29*

The procedure of Example 29 is followed omitting the alcohol stabilizer.

The mixture becomes an intractable gel before centrifuging.

EXAMPLE 30

The procedure of Example 7 is followed substituting an oxyaluminum stearate solution of 60 parts of oxyaluminum stearate and 40 parts of heavy aromatic solvent naphtha, f.p. 145° F., (Barsol®—150—Exxon Co., USA—Houston, Tex.) prepared by diluting a 65 percent OAS in heavy aromatic solvent naphtha solution, f.p. 145° F., (Barso®150) with additional heavy aromatic solvent naphtha, f.p. 145° F., (Barsol®D-150), for the OAS solution.

The homogenized solution is milky and penetrates well into concrete. The dried concrete beads water well.

COMPARATIVE EXAMPLE 30*

The procedure of Example 30 is followed omitting the alcohol stabilizer.

The mixture becomes an intractable gel before centrifuging.

EXAMPLE 31

The procedure of Example 7 is followed substituting an oxyaluminum stearate solution of 60 parts of oxyaluminum stearate and 40 parts of tech. white mineral oil, f.p. 250° F. (MFO®—24—Witco, Inc.—Gretna, La.) for the OAS-60 solution.

The homogenized emulsion is milky and penetrates well into a concrete block. The dried concrete beads water well.

COMPARATIVE EXAMPLE 31*

The procedure of Example 31 is followed omitting the alcohol stabilizer.

The mixture becomes an intractable gel before centrifuging.

Examples 28-31 when compared with corresponding Comparative Examples 28*-31* demonstrate the function of stabilizing amounts of alcohol or organic acids in emulsion compositions of the present invention.

All patents, applications and test methods mentioned above are hereby incorporated by reference.

Many variations of the present invention will suggest themselves to those skilled in the art and in light of the above, detailed description. All such variations are within the scope of the appended claims.

We claim:

1. An aqueous composition of emulsified oxyaluminum acylate solution for improving the water repellency of a substrate or for rendering said substrate water repellent, said aqueous composition comprising:
   (a) a substrate water repellency imparting amount of an oxyaluminum acylate solution which comprises:
      (i) from 5 to 80 parts by weight of oxyaluminum acylate; and
      (ii) from 95 to 20 parts by weight of at least one largely water insoluble solvent, based upon 100 parts by weight of (i) and (ii) combined;
   (b) an amount of at least one alcohol, organic acid or combination of the foregoing sufficient to stabilize said oxyaluminum acylate;
   (c) an effective amount of an emulsifier or mixture of emulsifiers; and
   (d) water.

2. A composition as defined in claim 1 wherein said oxyaluminum acylate (a)(i) is an oxyaluminum fatty acid acylate.

3. A composition as defined in claim 2 wherein said oxyaluminum acylate (a)(i) is an oxyaluminum stearate.

4. A composition as defined in claim 1 wherein said largely water insoluble solvent (a)(ii) is an aliphatic or aromatic hydrocarbon.

5. A composition as defined in claim 4 wherein said hydrocarbon is selected from the group consisting of mineral spirits, solvent naphtha, xylene, mineral oil and a combination of any of the foregoing.

6. A composition as defined in claim 1 wherein said water insoluble solvent (a)(ii) includes a cosolvent.

7. A composition as defined in claim 6 wherein said cosolvent is selected from the group consisting of an ether, a ketone, an ester, a halogenated hydrocarbon, a silane, a siloxane, a wax, a halogenated wax, a natural oil and a combination of any of the foregoing.

8. A composition as defined in claim 1 wherein said alcohol (b) is selected from the group consisting of a primary alcohol, a secondary alcohol, a tertiary alcohol and a combination of any of the foregoing.

9. A composition as defined in claim 8 wherein said alcohol is a primary alcohol.

10. A composition as define din claim 9 wherein said alcohol is a $C_6$-$C_{12}$ primary alcohol which is a liquid at 25° C.

11. A composition as defined in claim 10 wherein said alcohol comprises decyl alcohol.

12. A composition as defined in claim 8 wherein said alcohol is selected from the group consisting of n-butanol, t-amyl alcohol, n-hexanol, cyclohexanol, n-octanol, n-decanol, n-dodecanol, n-tridecanol, n-tetradecanol, n-hexadecanol, n-octadecanol, i-octadecanol, oleyl alcohol, 2-ethyl-1-hexanol, linalool, menthol, 1-2-dodecanediol, phenol, benzyl alcohol, pentachlorophenol, 1-naphthol, di-t-butyl-p-hdyroxytoluene, nonylphenol, and a mixture of any of the foregoing.

13. A composition as defined in claim 1 wherein said organic acid (b) is a largely water insoluble organic acid.

14. A composition as defined in claim 13 wherein said acid is selected from the group consisting of an aliphatic acid, a halogenated aliphatic acid, a halogenated aromatic acid, a halogenated aliphatic acid, a halogenated aromatic acid, an aromatic acid and a combination of any of the foregoing.

15. A composition as defined in claim 14 wherein said acid is selected from the group consisting of lauric acid, pelargonic acid, myristic acid, stearic acid, isostearic acid, oleic acid, linoleic acid, benzoic acid, perfluorooctanoic acid, hydrogenated tallow fatty acid, and a mixture of any of the foregoing.

16. A composition as defined in claim 14 wherein said acid is a fatty acid which is a liquid at 25°C.

17. A composition as defined in claim 1 wherein said emulsifier (c) has an HLB value of from about 1.5 to about 20.

18. A composition as defined in claim 17 wherein said emulsifier (c) has an HLB value of from about 4 to about 17.

19. A composition as defined in claim 1 wherein said emulsifier (c) is selected from the group consisting of at least one non-ionic, cationic, anionic and amphoteric emulsifier.

20. A composition as defined in claim 19 wherein emulsifier (c) is at least one non-ionic emulsifier.

21. A composition as defined in claim 20 wherein said emulsifier (c) comprises a blend of more than one ethoxylated alkylphenol.

22. A composition as defined in claim 21 wherein said emulsifier (c) comprises a blend of more than one ethoxylated octylphenol.

23. A composition as defined in claim 1 further comprising an additive selected from the group consisting of:
  (a) a fungicide;
  (b) a biocide;
  (c) a buffer;
  (d) a thickening agent;
  (e) a fumed silica;
  (f) a silane;
  (g) a siloxane;
  (h) a natural oil;
  (i) a synthetic oil;
  (j) a colorant;
  (k) a fragrance;
  (l) a UV stabilizer; and
  (m) a combination of any of the foregoing.

24. A water repellent article comprising
  (A) a substrate comprising masonry, limestone, marble, wood or a combination of any of the foregoing, having therein, thereon or therein and thereon
  (B) an aqueous composition of emulsified oxyaluminum acylate solution comprising:
    (a) a substrate water repellency imparting amount of an oxyaluminum acylate solution which comprises:
      (i) from 5 to 80 parts by weight of oxyaluminum acylate; and
      (ii) from 95 to 20 parts by weight of at least one largely water insoluble solvent, based upon 100 parts by weight of (i) and (ii) combined;
    (b) an amount of at least one alcohol, organic acid or combination of the foregoing sufficient to stabilize said oxyaluminum acylate;
    (c) an effective amount of an emulsifier or mixture of emulsifiers; and
    (d) water.

25. A process for increasing the resistance to penetration by aqueous media of a masonry, limestone, marble or wood substrate comprising:
  (A) adding on, in, or on and in said substrate an effective amount of a composition comprising emulsified oxyaluminum acylate solution comprising:
    (a) a substrate water repellency enhancing amount of an oxyaluminum acylate solution which comprises:
      (i) from 5 to 80 parts by weight of oxyaluminum acylate; and
      (ii) from 95 to 20 parts by weight of at least one largely water insoluble solvent based upon 100 parts by weight of (i) and (ii);
    (b) an oxyaluminum acylate stabilizing amount of at least one alcohol, organic acid or combination of the foregoing;
    (c) an effective amount of an emulsifier or mixture of emulsifiers; and
    (d) water.

26. A composition as defined in claim 7 wherein said siloxane is selected from the group consisting of silicone oil and silicone resin.

27. A composition as defined in claim 23 wherein said siloxane is selected from the group consisting of a silicone oil and a silicone resin.

* * * * *